United States Patent [19]

Bäbler

[11] 4,436,852
[45] Mar. 13, 1984

[54] PROCESS FOR THE COLOURATION OF LINEAR POLYESTERS IN THE MELT WITH PERYLENETETRACARBOXYLIC ACID BIS-METHYLIMIDE

[75] Inventor: Fridolin Bäbler, Allschwil, Switzerland

[73] Assignee: Ciba-Geigy Corporation, Ardsley, N.Y.

[21] Appl. No.: 438,445

[22] Filed: Nov. 2, 1982

Related U.S. Application Data

[63] Continuation of Ser. No. 338,710, Jan. 11, 1982, abandoned, which is a continuation of Ser. No. 156,243, Jun. 4, 1980, abandoned.

[30] Foreign Application Priority Data

Jun. 15, 1979 [CH] Switzerland .......................... 5624/79

[51] Int. Cl.$^3$ ............................................. C08L 67/02
[52] U.S. Cl. ...................................... 524/88; 524/102; 524/242; 524/358; 524/599; 524/605

[58] Field of Search ................ 260/40 P; 524/88, 102, 524/242, 358, 599, 605

[56] References Cited

U.S. PATENT DOCUMENTS 3,104,233  9/1963  Altermatt .......................... 260/40 P
3,112,289  11/1963  Stocker ............................ 260/42.21
3,372,138  3/1968  Bowman et al. .................. 260/40 P
4,141,881  2/1979  Babler ............................. 260/40 P

FOREIGN PATENT DOCUMENTS 1198372  7/1970  United Kingdom .
1370433  10/1974  United Kingdom .

*Primary Examiner*—Theodore E. Pertilla
*Attorney, Agent, or Firm*—Luther A. R. Hall

[57] ABSTRACT

A process for coloring linear polyesters in the melt in navy blue and dark blue shades, which process comprises using, as colorant, a mixture consisting of 0.2 to 1% by weight of perylenetetracarboxylic acid bis-methylimide, based on the amount of polyester, and a blue polymer-soluble colorant.

6 Claims, No Drawings

PROCESS FOR THE COLORATION OF LINEAR POLYESTERS IN THE MELT WITH PERYLENETETRACARBOXYLIC ACID BIS-METHYLIMIDE

This is a continuation of application Ser. No. 338,710, filed on Jan. 11, 1982, now abandoned, which in turn is a continuation of application Ser. No. 156,243, filed on June 4, 1980, now abandoned.

The use of perylenetetracarboxylic acid bismethylimide for colouring linear polyesters in the melt is described in German Offenlegungsschrift No. 2 153 087. Despite the excellent fastness properties of the polyester fibres coloured with this perylene pigment, the colourations themselves are of little interest on account of the unattractive brownish red shade.

German Offenlegungsschrift No. 2 732 586 discloses a process for the colouration of linear polyesters in the melt, wherein the colourant is a mixture of 0.001 to 0.2% by weight of a perylenetetracarboxylic acid derivative in solution and a polymer-soluble colourant which is different therefrom. Very strong and brilliant colours in the red and yellow sector are obtained by this process, but it is not possible to produce strong navy blue and dark blue shades.

It has now been found that it is possible to colour linear polyesters in the melt in strong, attractive navy blue and dark blue to blue-black shades by using, as colourant, a mixture consisting of 0.2 to 1% by weight of perylenetetracarboxylic acid bis-methylimide, based on the amount of polyester, and a blue polymer-soluble colourant.

This is surprising, as it was not to be expected that clear and strong navy blue and dark blue shades would be obtained with a reddish brown colourant in the mixtures of this invention. It is all the more surprising, as unattractive blue shades of poor colour strength are obtained when using mixtures of other perylenetetracarboxylic acid bis-phenyl- or bis-alkylimides in concentrations of more than 0.2%, based on the polyester, with a blue polymer-soluble colourant.

To accelerate the dispersion of the perylenetetracarboxylic acid bis-methylimide in the hot polyester melt, it is advantageous to use a fine-crystalline conditioned perylenetetracarboxylic acid bis-methylimide.

Instead of using the pure perylenetetracarboxylic acid bis-methylimide, it is also possible to use mixtures of perylenetetracarboxylic acid bis-methylimide obtained by cocondensation, starting from perylenetetracarboxylic acid dianhydride, with methylamine or methylamine donors, and 1 to 8 mol.%, based on 1 mole of perylenetetracarboxylic acid dianhydride, of aliphatic and/or cycloaliphatic primary amines containing 3 to 12 carbon atoms, for example butylamine, cyclohexylamine, laurylamine or 3-methoxypropylamine, with other bis-alkylimides. Compared with pure and coarse-crystalline perylenetetracarboxylic acid bis-methylimides which are obtained in conventional manner, such mixtures are usually in a fine-crystalline form which is more easily dispersible in the hot polymer melt.

As polymer-soluble blue colourants there may be used representatives of different classes of colourant. They must, however, have a sufficient thermostability, and a light absorption in the range from about 550 to 800 nm. It is preferred to use polymer-soluble phthalocyanines, especially the alkyl- or alkoxyalkylamides of copper phthalocyanine-tri- or -tetrasulfonic acid containing 1 to 20 carbon atoms in the alkyl moieties. Blue anthraquinones are also preferred, especially aminoanthraquinones, alkylaminoanthraquinones, cyclohexylaminoanthraquinones, hydroxylalkylaminoanthraquinones, alkoxyalkylaminoanthraquinones or phenylaminoanthraquinones, each of which can additionally contain, as further auxochromic groups, hydroxy, phenylmercapto or benzoylamino groups. Examples of such anthraquinones are: 1,4-bisarylaminoanthraquinones, especially 1,4-bisphenylaminoanthraquinones, which can be further substituted in the anthraquinone and phenyl moieties, such as 1,4-bis-halophenylaminoanthraquinones, 1,4-mesidinoanthraquinone, 1,4-bis-[(2′,4′,6′-trimethyl-3′-phenylaminosulfonyl-cyclohexyl)-amino]anthraquinone, 1,4-bis-(2′,6′-dimethylanilino)-6,7-dichloroanthraquinone; the mixture of isomers of 1,4-bis-(dichloroanilino)anthraquinone obtained in accordance with French patent specification No. 1 571 171, and 1-arylaminohydroxyanthraquinones, especially 1-phenylamino-4-hydroxyanthraquinones, e.g. 1-(4-acetaminoanilino)-4-hydroxyanthraquinone or 1-(4-propionylaminoanilino)-4-hydroxyanthraquinone, as well as a technical mixture of 1-(4′-acetaminoanilino)-4-hydroxyanthraquinone with 1,4-bis-(4′-acetamidoanilino)anthraquinone; and finally, 1-arylamino-4-acylaminoanthraquinones, especially 1-phenylamino-4-benzoylaminoanthraquinone which is substituted in the phenyl and benzoyl moiety, such as 1-phenylamino-4-benzoylaminoanthraquinone.

The ratio of polymer-soluble colourant to polyester can vary within wide limits, depending on the desired colour strength. In general, it is advisable to use 0.005 to 2 parts of colourant per 100 parts of polyester. At all events, in contrast to the perylenetetracarboxylic acid bis-methylimide, the colourant must be completely dissolved in the polymer and be also still present in dissolved state in the fibre.

The perylenetetracarboxylic acid bis-methylimide can be mixed with the polymer-soluble colourant before or during the colouration process. If they are mixed before the colouration process, then it is advantageous to use a predispersed formulation, e.g. a master batch or preparation. Large amounts of carrier are therefore added, e.g. 20 to 95%. A suitable carrier is especially a polyethylene terephthalate used for fibre manufacture, or a polyethylene teraphthalate or another polyester with a low softening point, e.g. polyethylene sebacate or a polyester co-polycondensate, or also a polystyrene with a softening point above 100° C.

Suitable linear polyesters are in particular those which are obtained by polycondensation of terephthalic acid or an ester thereof with a glycol of the formula HO—(CH$_2$)$_n$—OH, in which n is an integer from 2 to 10, or with 1,4-di(hydroxymethyl)cyclohexane, or by polycondensation of a glycol ether of a hydroxybenzoic acid, for example p-(β-hydroxyethoxy)-benzoic acid. The term "linear polyesters" also comprises copolyesters which are obtained by partial replacement of terephthalic acid by another dicarboxylic acid and/or by partial replacement of the glycol by another diol. However the preferred linear polyesters are polyethylene terephthalates.

The linear polyesters to be coloured are preferably homogeneously mixed with the dye in the form of powders, chips or granules. This can be accomplished for example by coating the polyester particles with the finely divided dry dyestuff powder or by treating the polyester particles with a solution or dispersion of the dye in water or an organic solvent and subsequently removing this latter. The treated polyester particles are fused by known methods in an extruder and pressed to objects, in particular sheets or filaments, or cast to boards.

Finally, the colourant can also be added direct to the polyester melt, for example by the injection method.

The polyesters obtained in the practice of this invention contain the perylenetetracarboxylic acid bismethylimide in finely dispersed, undissolved state. The colourations are distinguished by surprisingly high colour strength, levelness, clarity, brilliance, saturation and excellent lightfastness despite small amounts of colourant.

The textile fibre and fastness properties of the spun fibres coloured by this process are not impaired by the addition of the perylene compound. The spun fibres can be top-dyed with disperse dyes in conventional manner.

The invention is illustrated by the following Examples, in which parts and percentages are by weight.

EXAMPLE 1

1000 parts of polyethylene terephthalate granules, 10 parts of copper phthalocyaninetetrasulfonic acid 3-(isopropoxypropyl)amide and 2 parts of perylenetetracarboxylic acid bis-methylimide are intensively mixed in a mixing drum and then dried for about 24 hours at 100° C. in vacuo at 15 mm Hg. The treated granules are spun by the melt spinning process at about 290° C., affording fibres coloured in brilliant, very strong navy blue shades and having excellent lightfastness and textile properties.

EXAMPLE 2

The procedure of Example 1 is repeated, using 16 parts of copper phthalocyaninetetrasulfonic acid (3-methoxypropyl)amide and 4 parts of perylenetetracarboxylic acid bis-methylimide. Very strong navy blue colourations with analogous properties are obtained.

EXAMPLE 3

80 parts of copper phthalocyaninetetracarboxylic acid (3-methoxypropyl)amide, 20 parts of perylenetetracarboxylic acid bis-methylimide, 500 parts of finely ground sodium chloride, 150 parts of a polyester with a melting range from 80°-130° C. (Dynapol L 206, Dynamit Nobel) and 100 g of diacetone alcohol are kneaded for 5 hours at a temperature of 70°-75° C. in a divided trough kneader. The concentrate is converted into coarse granules by addition of 100 parts of water. For reduction to microparticles, these granules are subjected to wet grinding in a toothed colloid mill with as much water as is necessary. The resultant suspension is filtered, and the filter cake is washed free of salt and solvent and dried at 70° C. in a vacuum cabinet. The slightly sintered dry product is pulverised. The resultant blue preparation contains 40% of colourant. The powder can be used as such or it can be remelted in an extruder to granules, or else it can be further processed to a master batch of low colourant concentration. Navy blue polyester fibres with excellent properties are obtained by the procedure of Example 1 and 2.

EXAMPLE 4

The procedure of Example 1 is repeated, using 10 parts of the colourant of the formula

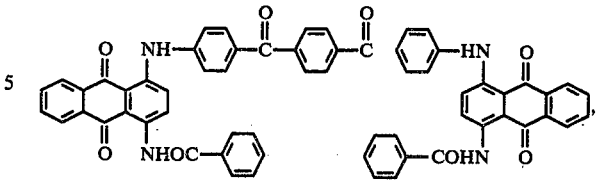

EXAMPLE 5

The procedure of Example 4 is repeated, using 1-phenylamino-4-benzoylaminoanthraquinone as polymer-soluble colourant. Very strong, dark blue, brilliant colourations with equally good properties are obtained.

EXAMPLE 6

(a) 240 parts of polyethylene terephthalate powder, 50 parts of greenish-blue copper phthalocyaninetetrasulfonic acid (3-methoxypropyl)amide and 10 parts of perylenetetracarboxylic acid bis-methylimide are mixed for 1½ hours in a container on a roller gear table. The mixture is dried for 48 hours at 80° C. in a vacuum drying cabinet, then extruded to a strand of 2 mm diameter in a single-screw extruder (screw diameter 20 mm, L:D 20, temperature 230° C.). The strand is cut to cylindrical granules with a length of 2-3 mm. The resultant preparation contains 20% of colourant.

(b) 50 parts of this preparation are mixed with 950 parts of polyethylene terephthalate in accordance with the particulares of Example 1 and the mixture is spun at about 290° C. Very strong navy blue colourations with equally good properties are obtained.

EXAMPLE 7

(a) 100 parts of perylenetetracarboxylic acid bis-methylimide, 500 parts of finely ground sodium chloride, 150 parts of a polyester with a melting range of 80°-130° C. (Dynapol L 206, Dynamit Nobel), and 100 parts of diacetone alcohol are kneaded for 5 hours at a temperature of 70°-75° C. in a divided trough kneader. The concentrate is converted into coarse granules by addition of 100 parts of water. For reduction to microparticles, these granules are subjected to wet grinding in a toothed colloid mill with as much water as is necessary. The resultant suspension is filtered, and the filter cake is washed free of salt and solvent and dried at 70° C. in a vacuum cabinet. The slightly sintered dry product is pulverised. The powder can be used as such or it can be remelted in an extruder to granules, or else it can be further processed to a master batch of low colourant concentration.

(b) 5 parts of this 40% preparation are mixed with 1000 parts of polyester granules and 10 parts of copper phthalocyaninetetrasulfonic acid (3-isopropoxypropyl)amide in accordance with the procedure of Example 1, and the mixture is spun at about 290° C. Very strong, navy blue colourations with equally good properties are obtained.

What is claimed is:

1. A process for colouring linear polyester in the melt in navy blue and dark blue shades, which process comprises using, as colourant, a mixture consisting of 0.2 to 1% by weight of finely dispersed, undissolved perylenetetracarboxylic acid bis-methylimide, based on the amount of polyester, and a blue polymer-soluble colourant.

2. A process according to claim 1, wherein the polymer-soluble colourant is a phthalocyanine derivative.

3. A process according to claim 2, wherein the polymer-soluble colourant is an alkylamide or alkoxyalkylamide of copper phthalocyanine-tri- or -tetrasulfonic acid.

4. A process according to claim 1, wherein the polymer-soluble colourant is an anthraquinone dye.

5. A process according to claim 4, wherein the polymer-soluble colourant is an aminoanthraquinone, alkylaminoanthraquinone, cyclohexylaminoanthraquinone, hydroxyalkylaminoanthraquinone, alkoxyalkylaminoanthraquinone or phenylaminoanthraquinone, each of which can additionally contain, as further auxochromic groups, hydroxyl, phenylmercapto or benzoylamino groups.

6. Linear polyester containing 0.2 to 1% by weight of finely dispersed, undissolved perylenetetracarboxylic acid bis-methylimide and a blue polymer-soluble colourant.

* * * * *